C. H. SEMPLE.
TIRE CASE.
APPLICATION FILED APR. 12, 1909.
998,042.
Patented July 18, 1911.
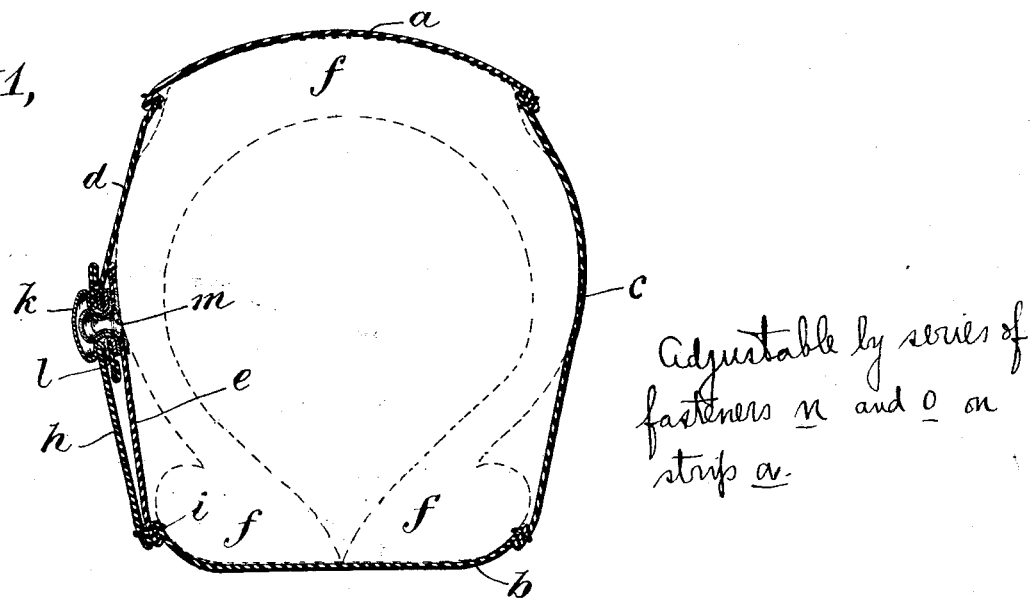
Flap h and strip
d fasten together
Adjustable by series of
fasteners n and o on
strip a.
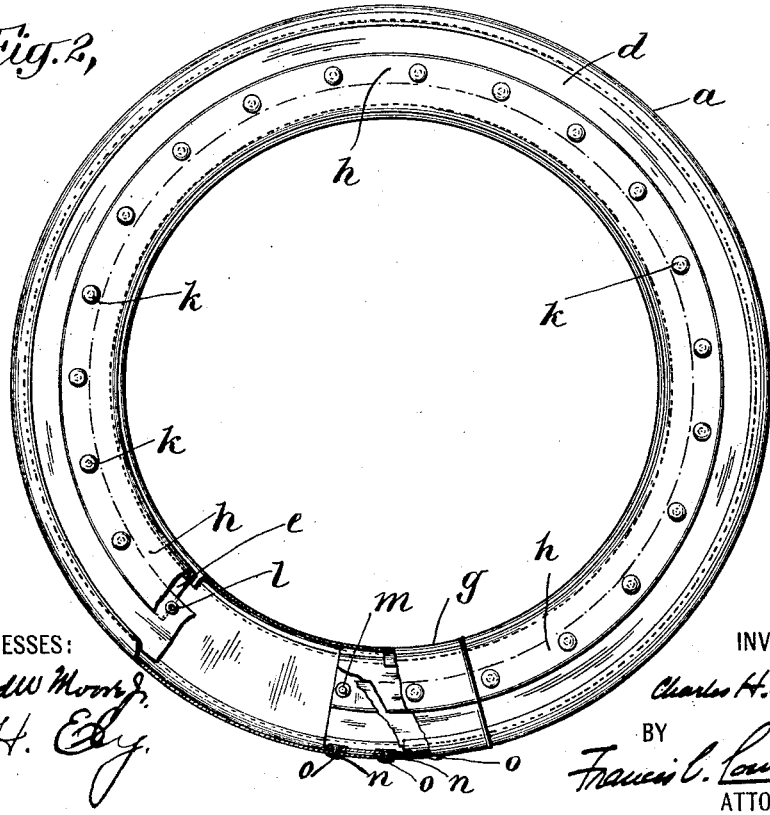
WITNESSES:
INVENTOR
Charles H. Semple
BY
Francis C. Lowthorp.
ATTORNEY

UNITED STATES PATENT OFFICE.

CHARLES H. SEMPLE, OF TRENTON, NEW JERSEY.

TIRE-CASE.

998,042.  Specification of Letters Patent.  Patented July 18, 1911.

Application filed April 12, 1909. Serial No. 489,304.

*To all whom it may concern:*

Be it known that I, CHARLES H. SEMPLE, a citizen of the United States, residing at Trenton, in the county of Mercer and State of New Jersey, have invented certain new and useful Improvements in Tire-Cases, of which the following is a specification.

My invention relates to tire cases, such as are commonly used to envelop extra tires carried by automobiles, and has for its object the production of a simple tire case which shall thoroughly protect the tire covered thereby from moisture and dust, and which can be readily opened and closed.

Illustrating my invention in the accompanying drawings, forming a part of this specification, I have shown in Figure 1 a cross-sectional view of my case with a tire-sheath inclosed therein; and in Fig. 2, a side view of my tire-case as the same appears when inclosing a tire, certain portions thereof being broken away to show the construction and arrangement of the case.

My case is made of waterproof material, such as carriage cloth, and the like, and I have shown it as formed of one strip of material, $a$, covering the tread of the inclosed tire; another strip, $b$, covering the inner edge of the tire; a third strip, $c$, covering one side of the tire, and two strips, $d$ and $e$, with their free sides or edges overlapping each other, and covering the opposite side of the tire. These several strips of fabric may be unitary or composed of several segmental sections, as is commonly practiced, and I make no claim to their specific form; it being only necessary that they snugly and smoothly inclose the tire $f$, and dispose certain of their parts to produce the watertight joint which I have devised. The several strips of fabric are overlapped at their edges and closely stitched together, as shown in the drawings, and their ends are arranged to overlap each other, as indicated at $g$ in Fig. 2. In addition to the several strips of fabric already mentioned, I employ another strip, $h$, of similar material, which is cut in circular form, and constitutes a flap, the inner or shorter edge of which is closely and smoothly stitched with the strips $b$, $e$, at their line of junction $i$; one line of stitching serving to unite three strips at said junction. The free side of the circular strip or flap, $h$, is provided with a series of buttons, $k$, while in the free edge of the strip $d$, are formed a series of eyeleted perforations, $l$, adapted to receive the studs, $m$, fixed on the free edge of the flap, $h$, and permit them to pass therethrough and engage said buttons, $k$. Several studs, $n$, are placed in a line near one end of the strip of fabric, $a$, and a corresponding number of buttons, $o$, are placed near the other end of the same strip, said studs, $n$, being arranged to engage said buttons, $o$, thus giving the case capacity to cover tires of greater or smaller diameter by lapping the ends of the case upon each other to a greater or less degree.

In placing and closing the case upon a tire the case is first opened at all points and the tire placed within it, the free edge of the strip, $e$, is brought under the free edge of the strip, $d$, and the studs $m$, are passed through the eyeleted perforations, $l$, in the strip, $d$. The flap, $h$, is then turned over the edge of the strip $d$, and the buttons $k$ are pushed down upon the studs, $m$, and sprung fast thereon. The end of the tire case not placed next the tire is passed over the other end of the case and is fixed thereto by springing the buttons, $o$, upon the studs $n$. The case when enveloping a tire is carried preferably with the ends of the tire case at the lower point of the structure, as shown in Fig. 2. By this means I provide, as will be readily seen, a gutter into which is drained the moisture which would otherwise tend to enter the joint formed by the strips, $d$, and $e$.

Having thus described my invention, I claim:

A tire case having an inner strip and a flap formed on its inner side and attached to the same edge of a side of the case, said strip having at its free edge a series of studs, and said flap having a series of socket buttons near its free edge, another inner strip attached to the edge of the other side of the case, and having formed in it a series of apertures through which the said studs may pass and enter said socket buttons; said inner strips and flap forming a closure lying entirely between the side pieces of the case.

CHARLES H. SEMPLE.

Witnesses:
 WILLIAM N. COOPER,
 I. M. ALTEMUS.

Copies of this patent may be obtained for five cents each, by addressing the "Commissioner of Patents, Washington, D. C."